(12) United States Patent
Kafentzis et al.

(10) Patent No.: US 6,756,068 B1
(45) Date of Patent: Jun. 29, 2004

(54) METHOD AND APPARATUS FOR VENDING FOOD PRODUCTS FROM A ROLLER-TYPE GRILLING APPARATUS

(76) Inventors: Kyle Kafentzis, 797 E. Parkschool Dr., Draper, UT (US) 84020; Sean Kafentzis, 797 E. Parkschool Dr., Draper, UT (US) 84020

( * ) Notice: Subject to any disclaimer, the term of this patent is extended or adjusted under 35 U.S.C. 154(b) by 0 days.

(21) Appl. No.: 10/081,994

(22) Filed: Feb. 21, 2002

(51) Int. Cl.$^7$ ............................................. A23L 3/14
(52) U.S. Cl. ..................... 426/394; 426/395; 426/403; 426/406; 426/407; 426/412; 426/519; 426/523
(58) Field of Search .................. 426/105, 109, 426/113, 115, 119, 120, 129, 389, 394, 395, 398, 403, 405, 406, 407, 411–413, 519, 523; 99/423, 427, 441, 443 R (56) References Cited

U.S. PATENT DOCUMENTS

| | | | | |
|---|---|---|---|---|
| 1,973,817 A | | 9/1934 | Lang ............................. 53/6 |
| 2,253,434 A | | 8/1941 | Kernick ......................... 53/5 |
| 2,433,622 A | * | 12/1947 | Novak ......................... 426/90 |
| 2,604,842 A | | 7/1952 | Dolce .......................... 99/423 |
| 2,609,301 A | * | 9/1952 | Lindsey ...................... 426/105 |
| 2,633,284 A | * | 3/1953 | Moffett et al. .............. 220/202 |
| 2,697,395 A | | 12/1954 | Steriss ......................... 99/423 |
| 3,032,249 A | * | 5/1962 | Kollar et al. ................ 220/672 |
| 3,135,614 A | * | 6/1964 | Parisi et al. ................. 426/113 |
| 3,215,338 A | * | 11/1965 | Schirmer .................... 229/87.08 |
| 3,433,652 A | * | 3/1969 | Van Leer ..................... 426/113 |
| 3,759,721 A | * | 9/1973 | Hawley ....................... 426/509 |
| 3,780,187 A | * | 12/1973 | Bard et al. .................. 426/113 |
| 4,516,485 A | | 5/1985 | Miller ......................... 99/339 |
| H1089 H | * | 8/1992 | D'Amato et al. ............ 37/395 |
| 6,220,152 B1 | * | 4/2001 | Baldwin et al. ............. 99/427 |
| 6,261,611 B1 | * | 7/2001 | Berman ........................ 426/90 |

* cited by examiner

*Primary Examiner*—Drew Becker
(74) *Attorney, Agent, or Firm*—Morris O'Bryant Compagni, P.C.

(57) ABSTRACT

A method and apparatus for vending food products from a roller-type grilling machine includes a packaging system that extends the product life on the grilling machine by keeping the food product from directly contacting the grilling machine. By packaging the product in accordance with the principles of the present invention, the food product is kept in a controlled environment until it is opened by the ultimate consumer after being heated by the grilling machine. The packaging is comprised of a cylindrical tube having a diameter that is sufficient to contain the desired food product and that will properly rotate on a roller-type grilling apparatus. Such packaging may comprise an elongate tube formed from heat tolerant plastic, cardboard-type paper lined with metal foil, or other materials known in the art. End caps are attached to the ends of the elongate tube and sealed relative thereto. At least one of the caps is designed to be relatively easily removed from the tube to allow an end user to open the packaging and remove the food product contained therein.

31 Claims, 5 Drawing Sheets

METHOD AND APPARATUS FOR VENDING FOOD PRODUCTS FROM A ROLLER-TYPE GRILLING APPARATUS

BACKGROUND

1. Field of the Invention

The field of the invention relates generally to a method and apparatus for vending and, more particularly, to a method and apparatus for vending food products on a roller-type grilling apparatus that is typically used to grill hot dogs and other sausage-type products; such roller-type grilling machines being common at convenience stores, concession stands and the like.

2. Background of the Invention

One of the first roller-type grills was disclosed in U.S. Pat. No. 2,604,842 entitled "Sausage Grill" which issued on Jul. 29, 1952, the teachings of which are herein incorporated by reference. This type of grill has been modernized over the years, but the basic concept remains. That is, a plurality of elongate cylindrical rods are placed in parallel relationship so as to support a hot dog between the rods. The rods are heated to a desired temperature and continuously rotated. As the rods rotate, the hot dogs rotate in an opposite direction within the space created between the rods. By rotating the hot dogs, the hot dogs remain hot without becoming burned, as would be the case if the hot dogs were to be heated by a grill without rotation.

Another common type of roller-type grilling apparatus is disclosed in U.S. Pat. No. 4,516,486 (the '485 patent) to Miller, the teachings of which are herein incorporated by reference, in which a plurality of rods extend transversely across an inclined platen. Food items are positioned on the platen between adjacent rods. The rods are then moved a predetermined distance over the platen by in a reciprocating matter to cause the food items to roll on the inclined platen.

More modern roller-type grills are similar in size to that shown in the '485 patent and include such features as the ability to create various zones of heat on a single roller-type grill to accommodate different types of foods. For example, the front rollers may be heated to a first temperature with the back rollers heated to a second higher temperature. The front rollers may then be employed to heat a first food product that requires less heating than a second food product placed on the back rollers. More recently, such roller grill units have been utilized to heat in a vending situation food products other than hot dogs. For example, burrito products have been manufactured to roll on and be heated by a roller grill. Such other products, however, have not been successful because of the relatively short product life experienced by such products.

Hot dogs have a product life on a roller grill of approximately twenty minutes. It takes approximately twenty minutes for hot dogs to even reach their desired vending temperature. After one hour of exposure, the hot dogs should be discarded and replaced by new products. Thus, the hot dogs only have approximately forty minutes of total vending time, after which they should are be disposed of and replaced with fresh product. It is often the case, however, that hot dogs remain on the grill well after their product life has expired.

In addition to the fact that the hot dogs become over cooked if left on a roller grill for more than one hour, the hot dogs can become contaminated with enough bacteria to become harmful to the consumer. Because the food product is not packaged, the food product is touched by hand when placed on the grill. In the case of a convenience store, it is typically the store clerk that is operating the roller grill and placing the food product on the grill. This is typically the same person handling money at the cash register. Thus, cross-contamination between bacteria on money and the food product is highly likely. In addition, if the grill itself is not properly maintained and cleaned, bacteria can be picked up from the grilling apparatus onto the food product. Moreover, the extended period of non-refrigeration of the food product can allow bacteria to grow to dangerous levels on the food product as well.

Another problem with roller grills exists with the products themselves. That is, food products such as hot dogs are typically frozen prior to being placed on the grill. If the hotdog or other food product is not sufficiently linearly straight, the food product can "crawl" from roller to roller until the food product falls off of the roller grill and onto the floor. Furthermore, if the hot dogs are not straight, they are commonly placed aside until thawed to allow them to straighten. If not carefully monitored, the hot dogs can sit unheated for an extended period of time even before being placed on the grill, again shortening the product life.

Thus, it would be advantageous to provide a food product that can be vended from a roller-type grilling apparatus that has a relatively long product life once placed on the grilling apparatus and that does not directly contact the surface of the grilling apparatus. These and other advantages will become apparent from a reading of the following description of the illustrated embodiments of a method and apparatus for vending food products from a roller-type grilling apparatus in accordance with the principles of the present invention.

SUMMARY OF THE INVENTION

A method and apparatus for vending food products from a roller-type grilling machine includes a packaging system that extends the product life on the grilling machine by keeping the food product from directly contacting the grilling machine. By packaging the product in accordance with the principles of the present invention, the food product is kept in a controlled environment until it is opened by the ultimate consumer after being heated by the grilling machine. The packaging apparatus and method of vending of the present invention typically increases the product life on the grill from about twenty minutes to over six hours.

The present method and apparatus for vending food products from a roller-type grilling apparatus also improves the storage characteristics of the food product. In many case, the food product packaged in accordance with the principles of the present invention need not be refrigerated prior to vending and has a shelf life of several weeks without refrigeration. In other cases where refrigeration is recommended or where the food product is frozen prior to vending, the storage life of the food product is increased from minutes to hours. Thus, an entire day's supply of product can be thawed overnight on the night before sale and then simply placed as needed on the grilling apparatus as sales warrant during the day.

The present invention also improves the handling characteristics for storage and transport prior to sale. That is, because the food product of the present invention is packaged through the vending process and only opened by the end consumer, the operator of the grilling apparatus never touches the edible portion of the product.

Furthermore, because the food product is packaged and thus substantially sealed from the external environment, the food itself never touches the grill. Thus, the present invention virtually eliminates the need to clean the roller grill after use.

Additionally, the present invention reduces the loss associated with the product becoming stale on the grill. Because the product life on the grill is significantly increased (i.e., from minutes to hours), the timing decisions associated with turning over stale product is removed from the sales staff. That is, based upon the projected sales for a given day based upon prior sales, product can be placed on the grill that is likely to be sold during a period of time. Because that period of time is relatively long, there is significantly less chance that the product in accordance with the present invention will become stale prior to sale.

The packaging system of the present invention provides all of the foregoing advantages as well as others not specifically enumerated by comprising either an airtight or pressure relief packaging apparatus to prevent the food contained within the package from becoming contaminated from the package's external environment until it is opened by the end consumer after heating on a roller grill. Such food products may include hot dogs, hot dogs in a bun, pizza rolls, cinnamon rolls, soups, bagels, pastas, and any other type of food product in which it is desired to vend the food product in a heated state.

In one embodiment of the present invention, the packaging is comprised of a cylindrical tube having a diameter that is sufficient to contain the desired food product and that will properly rotate on a roller-type grilling apparatus. Such packaging may comprise an elongate tube formed from plastic, cardboard-type paper lined with metal foil, or other materials known in the art. End caps are attached to the ends of the elongate tube and sealed relative thereto. At least one of the caps is designed to be relatively easily removed from the tube to allow an end user to open the packaging and remove the food product contained therein.

In another embodiment of the present invention, the packaging is comprised of an elongate tube to which end caps are attached. The end caps have a diameter that is larger than the diameter of the tube. As such, the end caps raise the tube off of the surface of the roller grill to prevent over heating and/or burning of the food product contained therein. Depending upon the heat of the roller grill, the end caps may be formed from a heat resistant material.

In another embodiment, the packaging of the present invention is comprised of a cylindrical tube defining a first food product chamber, a first end cap attached to one end of the tube and a second removable end cap attached to the other end of the tube. The second removable end cap defines a second food chamber therein and is sealed from contact with the first food chamber. With such a device, a first food product such as a bread stick can be placed in the first food chamber and a second liquid-type food product such as dipping sauce can be placed in the second food chamber. Thus, once the second end cap is removed and opened by the end user, the first food product can be removed from the first food chamber and dipped into the second food chamber containing the second food product.

In yet another embodiment, the packaging of the present invention is configured to rest on a roller grill, but not necessarily rotate with the rollers. The packaging comprises on or more elongate semicircular recesses along the bottom thereof, for receiving a portion of one or more rollers therein. Thus, the packaging rests on top of the roller grill allowing the rollers to spin without any significant movement of the packaging relative to the rollers. In such a way, the packaging can be maintained in an upright position. Such a package may be desired where pressure relief of the packaging is desired as is the case where the food product is primarily in liquid form (e.g., soups). One or more pressure relief valves can be placed in the top of the packaging to allow pressurized steam to escape from the package without the food product from spilling from the packaging. Such a non-rotating package can also be used to house food products that are not typically cylindrically configured such as bagels, cinnamon rolls, and the like.

In another embodiment, the packaging includes an outer package containing an inner bag. Such a configuration may be employed with liquid type food products, such as soups. The bag as well as the outer package may include one or more pressure relief valves to allow pressurized steam from escaping from the packaging without causing spilling of the food product.

In yet another embodiment, the packaging is comprised of an outer housing that is cylindrical in shape containing an inner housing separated from the outer housing by a plurality of bearings that allow the outer housing to rotate while the inner housing remains in a relatively upright orientation. By weighting the bottom of the inner housing, the inner housing will not rotate as the outer housing rotates. A pressure valve can then be provided in the top or near the top of the inner housing to allow pressurized steam to escape from the inner housing while the outer housing rotates.

The packaging system of the present invent on can be configured to provide a standard shape and size of the food product to maximize roller grill space. Because there is typically a cost associated with any vending space, there is a premium on maximizing the space. The packaging system of the present invention can be configured to maximize the amount of food product that can be placed on the grilling apparatus. That is, knowing the size of the grilling apparatus, the packaging containing the food product can be sized and shaped to maximize the surface area of the grilling apparatus so that little space on the grilling apparatus wasted.

BRIEF DESCRIPTION OF THE ILLUSTRATIONS

In the drawings, which illustrate what is currently considered to be the best mode for carrying out the invention.

DETAILED DESCRIPTION OF THE INVENTION

Figure 1:
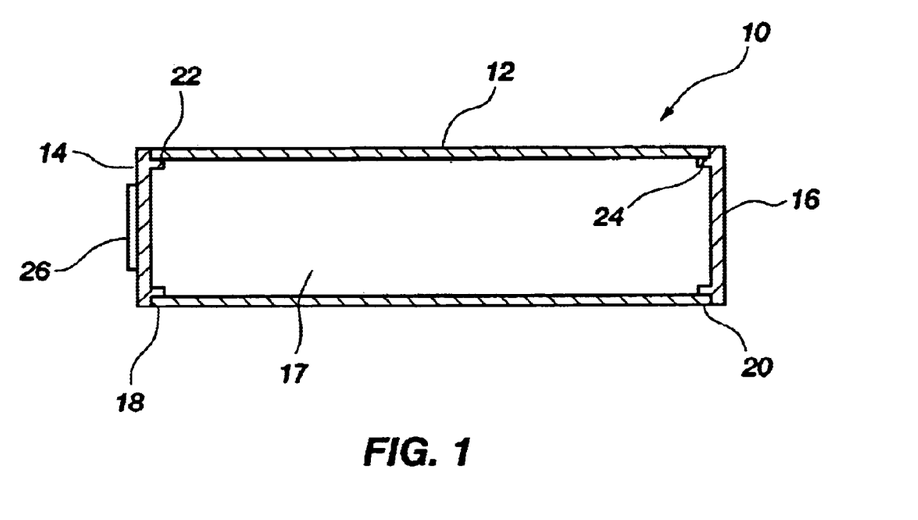
FIG. 1 is a cross-sectional side view of a first embodiment of food package configured for use with a roller-type grilling machine in accordance with the principles of the present invention.

Referring now to the drawings, FIG. 1 illustrates a food packaging apparatus, generally indicated at 10, in accordance with the principles of the present invention. The package 10 is relatively simple in construction and comprises an elongate tube 12 and a pair of end caps 14 and 16 that are attached to the ends 18 and 20 of the tube 12. The tube 12 and end caps 14 and 16 define an inner chamber 17 for housing a food product that can be vended along with the package 10 from a roller-type grilling machine (not shown). The food product is typically a pre-cooked food product that will utilize the grilling machine to heat the food product to a desired eating temperature. Such food products may include, for example, hot dogs, hot dogs with bun, cinnamon rolls, pizza, burritos, breakfast burritos, egg rolls, soup, chili, and any other desired food product. The end caps 14 and 16 may be formed from the same material as the tube 12 or, more likely, formed from plastic or metal with the tube 12 formed from plastic or a cardboard tube with the inside lined with aluminum or other metal foil to prevent moisture from the contents of the package from passing through the tube 12. In any event, the materials comprising the packaging apparatus 10 is comprised of a material that is capable of withstanding the temperatures associated with roller-type grilling machines known in the art or those designed in the future, which is typically in the range of approximately 90 to 230 degrees Fahrenheit. By packaging the food product while it is being heated, the product life on the grilling machine is extended from about twenty minutes to over six hours without the freshness of the product being significantly diminished. As such, the vendable time period of each product placed on the grilling machine is significantly extended over prior art methods of vending food products from such machines.

The end caps 14 and 16 may be adhesively attached to the ends 18 and 20, respectively, of the tube 12 and are preferably provided with an interference fit between the end caps 14 and 16 and the tube 12. The end caps 14 and 16 have portions 22 and 24, respectively, that fit within the tube 12 to better hold the end caps 14 and 16 on the tube 12. In addition, one or both of the end caps 14 and 16 may be provided with a pull tab 26 to allow the consumer to grasp and pull the end cap 14 from the tube 12. It is also contemplated that the package of the present invention may be comprised similar to that of a PRINGLES car in which the end cap 14 is scored around its rim such that when the pull tab 26 is pulled, the portion of the end cap 14 that has been scored can be removed while leaving the rim of the end cap 14 attached to the tube 12.

The package 10 may have a cylindrical shape or other round or substantially round shape, such as octagon or other multi-side shape that allows the package to roll relative to the rollers of a roller-type grilling machine. Such a package is particularly useful for containing food products that do not produce a significant amount of steam when heated, such as bread-type products, that may otherwise cause the package to become explosive if pressure within the package is allowed to build beyond the pressure limits of the package.

Figure 2:
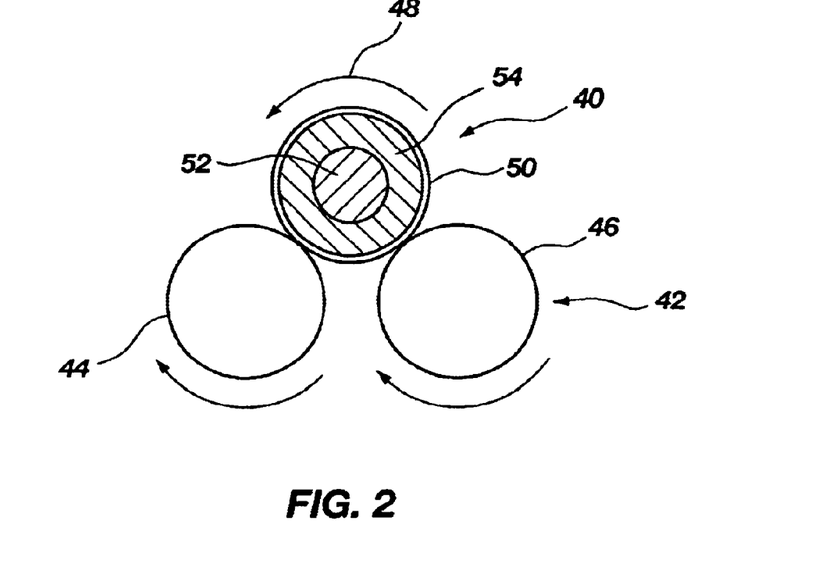
FIG. 2 is a cross-sectional end view of a second embodiment of a food package containing an edible food product positioned on a pair of rollers of a roller-type grilling machine in accordance with the principles of the present invention.

As shown in FIG. 2, a cylindrical food package, generally indicated at 40, is configured for use on a roller type grilling machine, generally indicated at 42. The grilling machine 42 is comprised of a pair of heated rollers 44 and 46 that form heating elements of the device and that rotate relative to their longitudinal axis in the direction of the arrows. The food package 40 is placed upon adjacent rollers 44 and 46 and caused to rotate in a direction opposite to the direction of the rollers 44 and 46 as indicated by arrow 48. The package 40 is comprised of a cylindrical tube 50 that houses a food product such as a hot dog 52 surrounded by a bread product 54 that surrounds the hot dog 52. By substantially continuously rotating the package 40, the points of contact between the rollers 44 and 46 and the tube 50 substantially continuously change preventing the rollers from burning the food product 54 contained within the tube 50. Conversely, if the package 50 were to stay in the position shown in FIG. 2 with the rollers 44 and 46 not rotating, hot spots would develop in the food product 54 originating at the points of contact between the rollers 42 and 44 and the tube 50 that would potentially cause the food product 54 to burn. The food products 52 and 54 substantially fill the inner diameter of the tube 50 so as to provide substantially even weighting of the tube 50 relative to its longitudinal axis. In doing so, the tube 50 will roll more easily relative to the rollers and will be less likely to become "stuck" relative to the rollers as may be the case if the weight of the food product was shifted to one side of the tube 50.

The rollers 42 and 44 typically have a diameter of approximately 1.5 inches. The distance between adjacent rollers 42 and 44, from center-to-center of the roller-type grilling machine 42 is typically approximately 2 inches. As such, it may be desired to make the diameter of a cylindrical package 40 configured for rolling atop the pair of adjacent rollers 44 and 46 to be in the range of approximately 1.5 to 2.125 inches. In this way, the diameter of the package 40 is maximized while preventing interference with other such packages 50 that are positioned on the next adjacent pair of rollers. Of course, the diameter of the package 50 could be made larger to span more than two adjacent rollers if desired.

Figure 3:
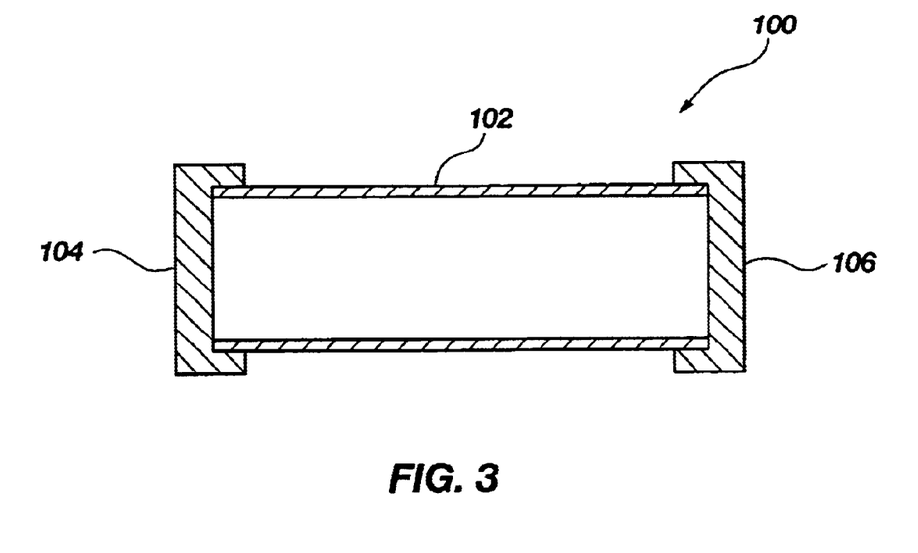
FIG. 3 is a cross-sectional side view of a third embodiment of food package configured for use with a roller-type grilling machine in accordance with the principles of the present invention.

Referring now to FIG. 3, a food package, generally indicated at 100 in accordance with the principles of the present invention, is illustrated. The food package 100 is comprised of an elongate housing 102 with a pair of end caps 104 and 106. The end caps 104 and 106 are wider than the housing 102 so as to raise the housing 102 above the rollers of the grilling machine (not shown). In the case where the package 100 is substantially cylindrical, the diameters of the end caps 104 and 106 are greater than the diameter of the tube 102. Thus, the end caps 104 and 106 rest on the rollers of the roller grill (see FIG. 2) and suspend the housing 102 above the rollers. While heat from the grill can reach the package 100 by heat conduction through the end caps 104 and 106 and by heat convection through the housing 102, the food product contained within the housing 102 is protected from becoming over heated that may otherwise occur by direct contact between the housing 102 and the grilling machine.

Figure 4:
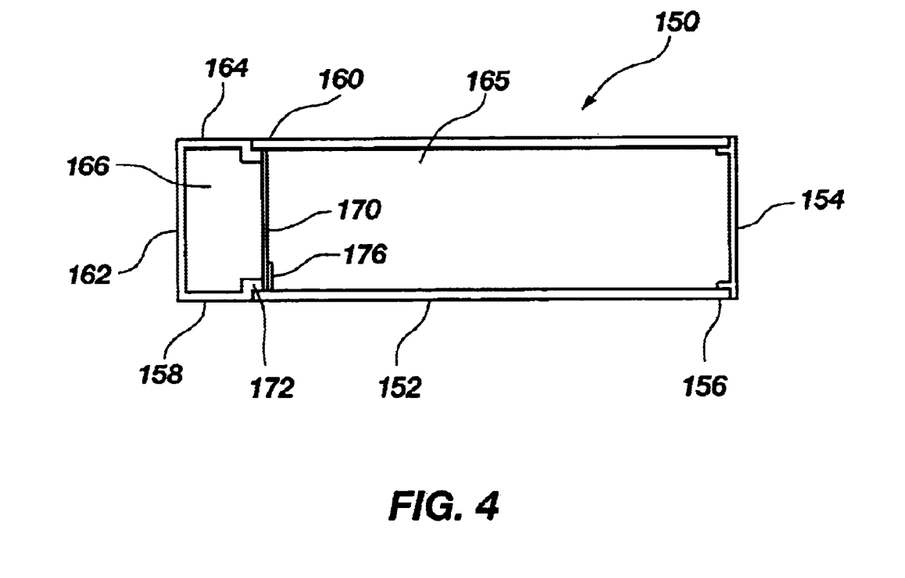
FIG. 4 is a cross-sectional side view of a fourth embodiment of food package configured for use with a roller-type grilling machine in accordance with the principles of the present invention.

FIG. 4 illustrates yet another embodiment of a food package, generally indicated at 150, in accordance with the principles of the present invention. The package 150 is provided with a pair of chambers for containing different food products. The package 150 is comprised of an elongate tube 152 a first end cap 154 attached to the distal end 156 of the tube 152 and a second end cap 158 attached to the proximal end 160 of the tube 152, the tube 152 and end caps 154 and 158 defining a primary food product chamber 165. The second end cap 158 includes an end portion 162 and a side wall 164 that define a secondary food chamber 166. A removable membrane 170 is attached to the distal end 172 of the end cap 158 and separates and prevents intermixing of the food products contained in the primary and secondary chambers 165 and 166, respectively. The membrane 170 may be comprised of an aluminum or other metal foil sheet 174 adhesively attached to the distal end of the end cap 158. A pull tab 176 is attached to the membrane 170 proximate an edge thereof for grasping by a user and for removing the membrane 170 from the end cap 158. The end cap 158 is configured to contain a liquid type food product, such as a dipping sauce, with the primary chamber 165 containing a bread-type product that can be dipped into the end cap 158 once the end cap 158 is removed from the tube 152. Thus, the end user would first remove the end cap 158 from the tube 152 to separate the two food products and remove the membrane 170 from the end cap 158 to allow access to the secondary chamber 166. The food product contained in the primary chamber 165 can then be dipped as desired into the secondary chamber 166.

Figure 5:
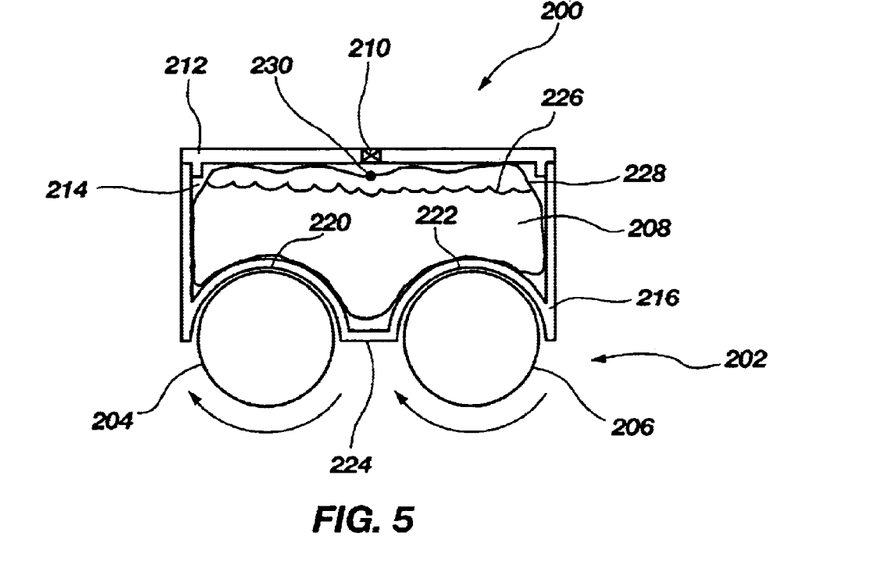
FIG. 5 is a cross-sectional side view of a fifth embodiment of food package configured for use with a roller-type grilling machine in accordance with the principles of the present invention.

As shown in FIG. 5, it is also desirous to provide a package, generally indicated at 200, in accordance with the principles of the present invention that can be used in combination with a roller-type grilling machine, generally indicated at 202, in which the heated rollers 204 and 206 rotate as shown by the arrows while the package 200 remains relatively stationary atop the rollers 204 and 206. Such a package 200 may be utilized where the food product 208 is primarily in liquid form, such as a soup, chili, or the like. With such liquid-type products, there is a need to allow steam created by the heating of the liquid food product to escape from the packaging 200. Otherwise, the pressure build up within the package 200 could cause the package 200 to rupture. As such, a pressure release valve 210 is provided in the lid 212 of the package 200 to allow steam formed within the food chamber 214 to escape as needed. Similarly, the pressure relief valve may be replaced with a removable seal that opens a small orifice in the lid 212 to allow steam to escape as the food product is heated. As such, the package 200 could be sealed when shipped and stored and then opened as previously described when placed on the roller grill to allow steam to escape. Because, the package 200 is designed to keep the package 200 in an upright position as it is heated, the opening in the lid 212 will maintain its orientation so that the food product contained within the package 200 is not expelled. The lid 212 is attached to a food tub 216 and defines the food chamber 214 therein between. The tub 216 is comprised of a pair of longitudinally extending semi-circular recesses 220 and 222 that extend along the bottom 224 of the tub 216. The recesses 220 and 222 are configured for resting upon a corresponding pair of adjacent rollers 204 and 206 while allowing the rollers 204 and 206 to rotate without being significantly impeded by the recesses 220 and 222. As such, heat from the rollers 204 and 206 can be conducted through the bottom 224 of the tub 216 and into the food product 208 while keeping the tub 216 in an upright position. Such an upright position prevents the pressure relief valve 210 from being positioned below the fluid level 226 of the food product 208 that could otherwise result in the food product 208 from being expelled through the pressure relief valve 210.

While not necessarily required, it is also contemplated that a food bag 228 having its own pressure relief valve 230 may be contained within the tub 216 to contain the food product 208. Such a bag 228 could be employed to further prevent the liquid-type food product 208 from spilling out of the pressure release valve 210.

Figure 6:
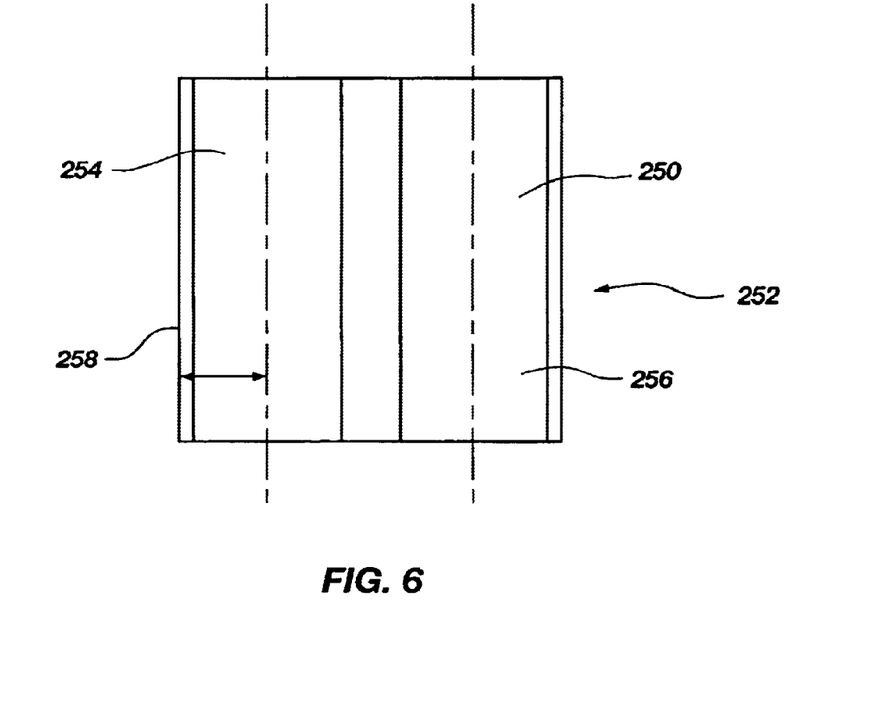
FIG. 6 is a bottom view of a sixth embodiment of food package configured for use with a roller-type grilling machine in accordance with the principles of the present invention.

As shown in FIG. 6, the bottom 250 of a tub, generally indicated at 252 and having a cross-sectional side view such as that shown in FIG. 5, has a rectangular configuration with the recesses 254 and 256 extending along the length thereof. Such a rectangular configuration can be utilized to maximize the grilling surface area of a roller-type grilling machine. As with the tub 216 shown in FIG. 5, the tub 252 extends beyond the lateral edge of the roller so as to allow a similarly configured tub to be positioned on the next adjacent roller proximate the tub 252. That is, the distance D between the center-line of the recess 254 to the edge 258 is less than half of the distance between longitudinal centers of adjacent rollers of the roller-type grilling machine.

Figure 7:
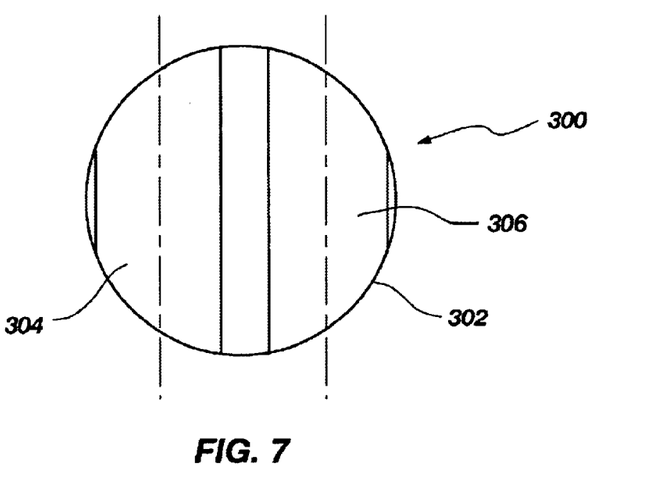
FIG. 7 is a bottom view of a seventh embodiment of food package configured for use with a roller-type grilling machine in accordance with the principles of the present invention.

Likewise, in FIG. 7, a tub, generally indicated at 300, has a cross-sectional side view similar to that illustrated in FIG. 5. In this example, however, the tub 300 has a bottom 302 that is substantially circular in configuration with the recesses 304 and 306 for maintaining the tub 300 on a roller grill extending thereon. Thus, it is contemplated that the shape of such a package may take on any desired shape. Moreover, the recesses 304 and 306 may be replaced with protrusions or other surface features that can engage the rollers of a roller grill to maintain the position of the tub relative to the roller grill.

Figure 8A:
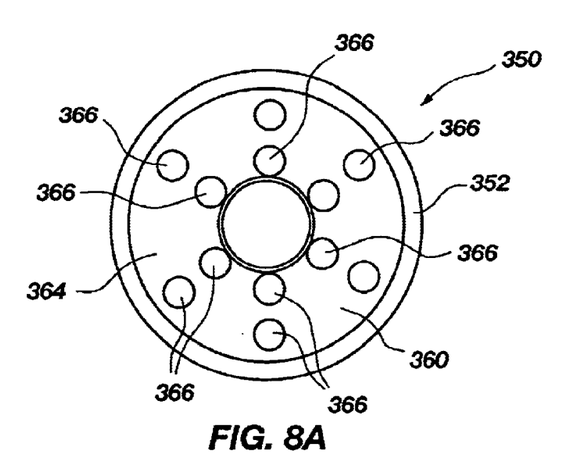
FIG. 8A is a top view of an eighth embodiment of food package configured for use with a roller-type grilling machine in accordance with the principles of the present invention.
Figure 8B:
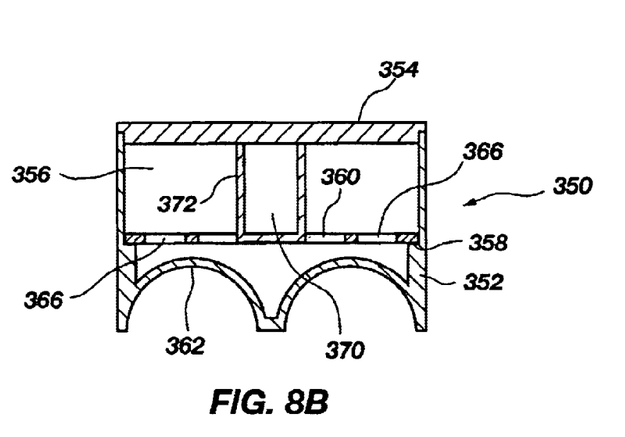
FIG. 8B is a cross-sectional side view of the food package of FIG. 8.

Referring now to FIG. 8A, a food product package, generally indicated at 350 is illustrated, in accordance with the principles of the present invention. The package 350 has a configuration similar to that of FIGS. 5 and 7 including a tub portion 352 and a lid portion 354. The lid portion 354 engages with the top of the base or tub portion 352 to seal the contents of the tub portion 352 therein. The tub portion 352 defines a primary food chamber 356 and includes an interior circumferential ledge 358 for supporting an insert 360 above the bottom 362 of the tub portion 352. The insert 360 provides a shelf for supporting a food product thereon so that the food product is not likely to become burned or otherwise overheated by the roller-type grilling machine. The base 364 of the insert 360 is provided with a plurality of apertures 366 that allow the transfer of heat from the bottom 362 of the tub portion 352 into the primary chamber 356. In the center of the base 364 of the insert 360 is a secondary chamber 370 defined by a cylindrically shaped wall 372 depending upwardly from the base 364 in the center thereof. Such a package 350 is configured to contain a bagel or other similarly configured product that can be fitted within the tub portion 352 with the wall 372 positioned within the center of the bagel. The secondary chamber 370 can be filled with cream cheese or other spreadable material for spreading on the bagel by the consumer. The wall 372 prevents the material contained in the chamber 370 from causing the bagel from becoming soggy prior to consumption by the end user.

Figure 9:
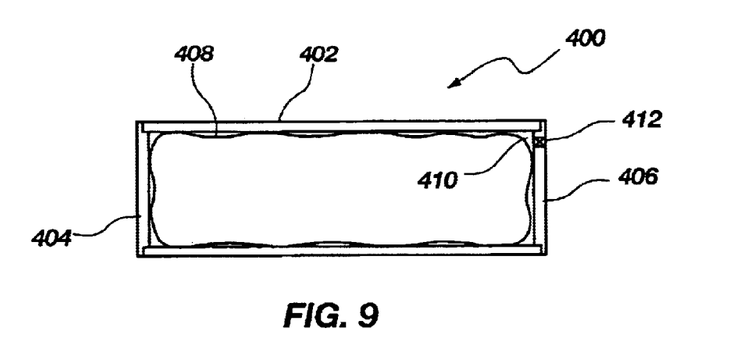
FIG. 9 is a cross-sectional side view of a ninth embodiment of food package configured for use with a roller-type grilling machine in accordance with the principles of the present invention.

FIG. 9 shows yet another embodiment of a package, generally indicated at 400, in accordance with the principles of the present invention. The package 400 is comprised of an elongate housing 402 and a pair of end caps 404 and 406. The package 400 further includes an internal bag 408 for containing a liquid-type food product, such as soup or chili. Both the bag 408 and the end cap 406 are provided with pressure relief valves 410 and 412, respectively, that allow steam to escape from the package as the liquid therein is heated. The package is configured so as to not rotate relative to the movement of the roller-type grilling apparatus so as to keep the pressure valves 410 and 412 toward the top of the package 400.

Figure 10:
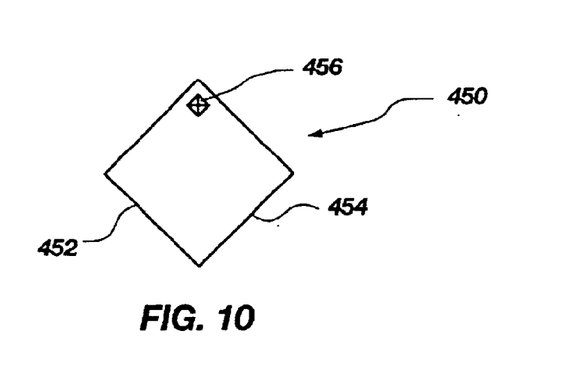
FIG. 10 is an end view of a tenth embodiment of food package configured for use with a roller-type grilling machine in accordance with the principles of the present invention.

For example, as shown in FIG. 10, the package 450 may have a square shape with its lower sides 452 and 454 abutting the rollers and its square shape preventing the package 450 from rotating along with the rollers. The pressure valve 456 thus remains proximate the top of the package when the product is properly placed on the roller grill.

Figure 11:
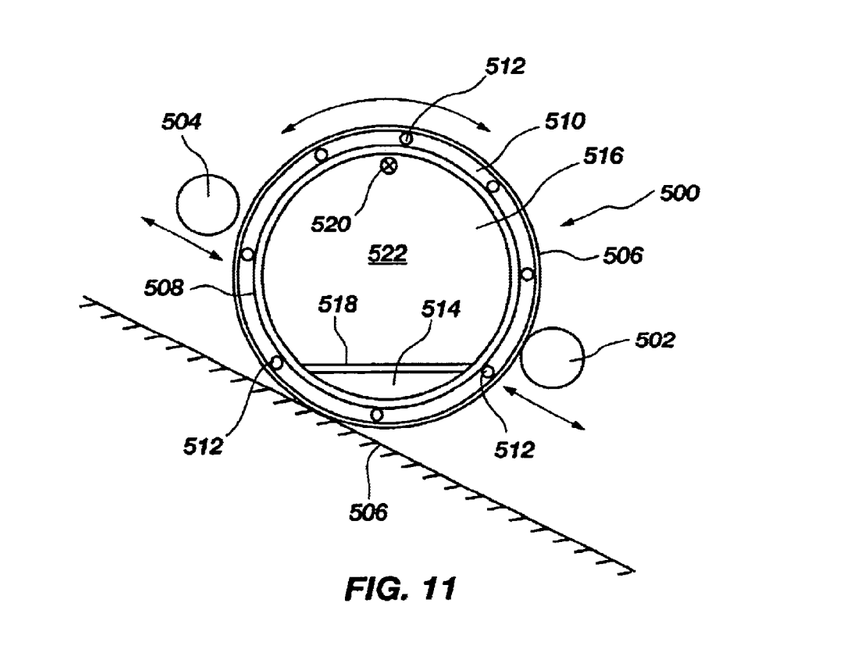
FIG. 11 is a cross-sectional end view of an eleventh embodiment of food package configured for use with a roller-type grilling machine in accordance with the principles of the present invention.

Finally, as shown in FIG. 11, the concepts disclosed herein may be utilized with all types of roller-type grilling machines known in the art. For example, some roller grills include a plurality of laterally extending rods 502 and 504 that move laterally relative to a stationary heated grill 506 that is inclined at an angle. By placing a round food product between the rods 502 and 504, lateral movement of the rods 502 and 504 causes the food product to roll across the grill 506. Typically, because of the slope of the grill 506, the food product will rest against the lower rod 502 with the rod 504 supporting and moving the next adjacent food product. Each of the foregoing examples of a food product package of the present invention may be heated with such grilling machines. Thus, reference to "rolling-type grilling machines" herein is intended to include all grilling machines, now known or developed in the future, that utilize any type of mechanism that is provided to roll the food relative to a heated surface and/or a heat source.

FIG. 11 shows yet another embodiment of a package, generally indicated at 500, in accordance with the principles of the present invention used on an inclined grilling machine. The package 500 is configured with an outer cylindrical housing 506 and an inner cylindrical container 508. The housing 506 and the container 508 are separated by an annular space 510 defining a bearing race which contains a plurality of roller-type bearings, such as bearings 512, that allows the outer housing to rotate with movement of the grilling machine while the inner container 508 substantially maintains its orientation. That is, the inner container will stay somewhat upright as the outer housing 506 rotates. The inner container is provided with a weighted bottom portion 514 that is separated from the food chamber 516 by a longitudinally extending wall 518. The weight 514 maintains the inner container in a relatively upright position as the outer housing 506 rotates. Because the weight 514 is sealed from the food chamber 516, the weight 514 may be comprised of any suitable material, such as a metal or other dense material. Of course, with the use of such a package 500 on a reciprocating type roller grill as shown will cause the inner container 508 to oscillate as well to some degree. The weight 514, however, will help prevent the inner container 508 from inverting during such oscillating movement. A pressure relief valve 520 is provided proximate the top of the back wall 522. In such a position and by maintaining the inner container 508 in an upright position, it is unlikely that the food product contained therein, such as a soup, will be expelled through the valve 520 if the pressure within the container 516 causes opening of the valve 520.

While the method and apparatus for vending food products from a roller-type grilling apparatus of the present invention have been illustrated with respect to certain illustrated embodiments to show what is believed to be the best mode of the invention, it is contemplated that upon review of the present invention, those of skill in the art will appreciate that various modifications and combinations may be made to the present embodiments without departing from the spirit and scope of the invention as recited in the claims. As such, the claims provided herein are intended to cover such modifications and combinations and all equivalents thereof. Therefore, reference herein to specific details of the illustrated embodiments is by way of example and not by way of limitation.

What is claimed is:

1. A method of heating a packaged food product, comprising:
    providing a roller-type grilling machine;
    providing a food product in a non-edible sealed package, said non-edible sealed package comprising an elongate, substantially cylindrical tube, said food product contained within said sealed package;
    placing the non-edible sealed package on the grilling machine;
    rotating the non-edible sealed package with the grilling machine; and
    heating the product to a desired temperature on the grilling machine.

2. The method of claim 1, further comprising pre-cooking said food product prior to placement in said non-edible sealed package.

3. The method of claim 1, further comprising providing a pair of end caps, one on each end of the tube, at least one of the end caps configured to be removable by a consumer for removing the food product from the tube.

4. The method of claim 3, further comprising providing the end caps with a larger diameter than the diameter of the tube so that the end caps contact at least one heating element of the grilling machine and suspend the tube above at least one heating element of the grilling machine.

5. The method of claim 3, further comprising providing at least one of the end caps with a secondary food chamber for containing a second food product.

6. The method of claim 5, further comprising attaching a membrane to said at least one of the end caps for separating the secondary food chamber from the food product.

7. The method of claim 1, further comprising providing an outer housing around said tube, said outer housing and said tube defining an annular space thereinbetween for receiving a plurality of roller bearings that allow the outer housing to rotate while the inner tube remains in a substantially upright position.

8. The method of 1, further comprising providing said non-edible sealed package with a substantially sealed bag within said tube, said food product being contained within said bag.

9. A method of vending a pre-packaged food product, comprising:
    providing a roller-type grilling machine;
    providing a pre-cooked food product in a non-edible substantially sealed package, said non-edible sealed package configured to be rotated and simultaneously heated by the grilling machine;

placing the non-edible sealed package on the grilling machine for rotating and heating the food product in the non-edible substantially sealed package;

rotating the non-edible substantially sealed package with the grilling machine;

heating the food product on the grilling machine; and selling the heated food product in the non-edible substantially sealed package to a consumer.

10. The method of claim 9, further comprising heating said food product to a temperature of between approximately 90 and 230 degrees Fahrenheit.

11. The method of claim 9, further comprising heating said food product for a period of up to approximately six hours without significantly diminishing the freshness of the food product.

12. The method of claim 9, further comprising providing a pair of end caps, one on each end of the sealed package, at least one of the end caps configured to be removable by a consumer for removing the food product from the non-edible sealed package.

13. The method of claim 12, further comprising providing the end caps with a larger diameter than the diameter of the remainder of the non-edible sealed package so that the end caps contact at least one heating element of the grilling machine and suspend the remainder of the non-edible sealed package above at least one heating element of the grilling machine.

14. The method of claim 12, further comprising providing at least one of the end caps with a secondary food chamber for containing a second food product.

15. The method of claim 14, further comprising attaching a membrane to said at least one of the end caps for separating the secondary food chamber from the pre-cooked food product.

16. The method of claim 9, further comprising providing an outer housing around said non-edible sealed package, said outer housing and said sealed package defining an annular space thereinbetween for receiving a plurality of roller bearings that allow the outer housing to rotate while the inner non-edible sealed package remains in a substantially upright position.

17. The method of 9, further comprising providing said non-edible sealed package with a substantially sealed bag, said food product being contained within said bag.

18. A method of vending a pre-packaged food product on a roller-type grilling machine, comprising:

providing a food product in a non-edible substantially sealed package, said non-edible substantially sealed package configured to be positionable and simultaneously heated by a roller-type grilling machine;

placing the non-edible substantially sealed package on the grilling machine for heating the food product in the non-edible substantially sealed package;

heating the food product to a desired temperature on the grilling machine; and selling the heated food product in the non-edible substantially sealed package to a consumer.

19. The method of claim 18, further comprising heating said food product to a temperature of approximately 90 to 230 degrees Fahrenheit.

20. The method of claim 18, further comprising providing said non-edible sealed package in the form of an elongate tube with a pair of end caps, one on each end of the elongate tube, at least one of the end caps configured to be removable by a consumer for removing the food product from the non-edible sealed package.

21. The method of claim 20, further comprising providing the end caps with a larger diameter than the diameter of the remainder of the non-edible sealed package so that the end caps contact at least one heating element of the grilling machine and suspend the remainder of the non-edible sealed package above at least one heating element of the grilling machine.

22. The method of claim 20, further comprising providing at least one of the end caps with a secondary food chamber for containing a second food product.

23. The method of claim 22, further comprising attaching a membrane to said at least one of the end caps for separating the secondary food chamber from the food product.

24. The method of claim 18, further comprising providing an outer housing around said non-edible sealed package, said outer housing and said non-edible sealed package defining an annular space thereinbetween for receiving a plurality of roller bearings that allow the outer housing to rotate while the inner non-edible sealed package remains in a substantially upright position.

25. The method of claim 18, further comprising providing said non-edible sealed package with a substantially sealed bag, said food product being contained within said bag.

26. The method of claim 18, further comprising configuring said non-edible sealed package to rest on the roller-type grilling machine without being rotated thereby.

27. The method of claim 26, further comprising providing said non-edible sealed package with at least one recess on a bottom thereof for at least partially receiving a roller of the roller-type grilling machine therein for holding the sealed package thereon.

28. The method of claim 27, further comprising providing said non-edible sealed package with a primary and secondary food chamber for containing two different food products.

29. The method of claim 27, further comprising means for releasing steam from said sealed package as said non-edible sealed package is heated.

30. The method of claim 18, further comprising heating said food product for a period of up to approximately six hours without significantly diminishing the freshness of the food product.

31. The method of claim 18, further comprising pre-cooking said food product prior to placing in said non-edible sealed package.

* * * * *